J. G. DUNHAM.
Mower.

No. 18,238. Patented Sept. 22, 1857.

UNITED STATES PATENT OFFICE.

JOHN G. DUNHAM, OF RARITAN, NEW JERSEY.

IMPROVEMENT IN REAPING AND MOWING MACHINES.

Specification forming part of Letters Patent No. 18,238, dated September 22, 1857.

*To all whom it may concern:*

Be it known that I, JOHN G. DUNHAM, of Raritan, county of Somerset, and State of New Jersey, have invented certain new and useful Improvements in Mowing and Reaping Machines, in maintaining the level of the sickle-beam as it is raised or lowered, and preserving its steadiness and that of the whole machine; and I do hereby declare that the following is a full and exact description thereof, reference being had to the accompanying drawings, and to the letters of reference marked thereon, and making a part of this specification.

The nature of my invention consists in so arranging and constructing the outer end of the sickle-beam that it can be sustained at different heights by the use of a single wheel, and thus both ends of the sickle-beam be kept on a level with each other.

Figure 1:
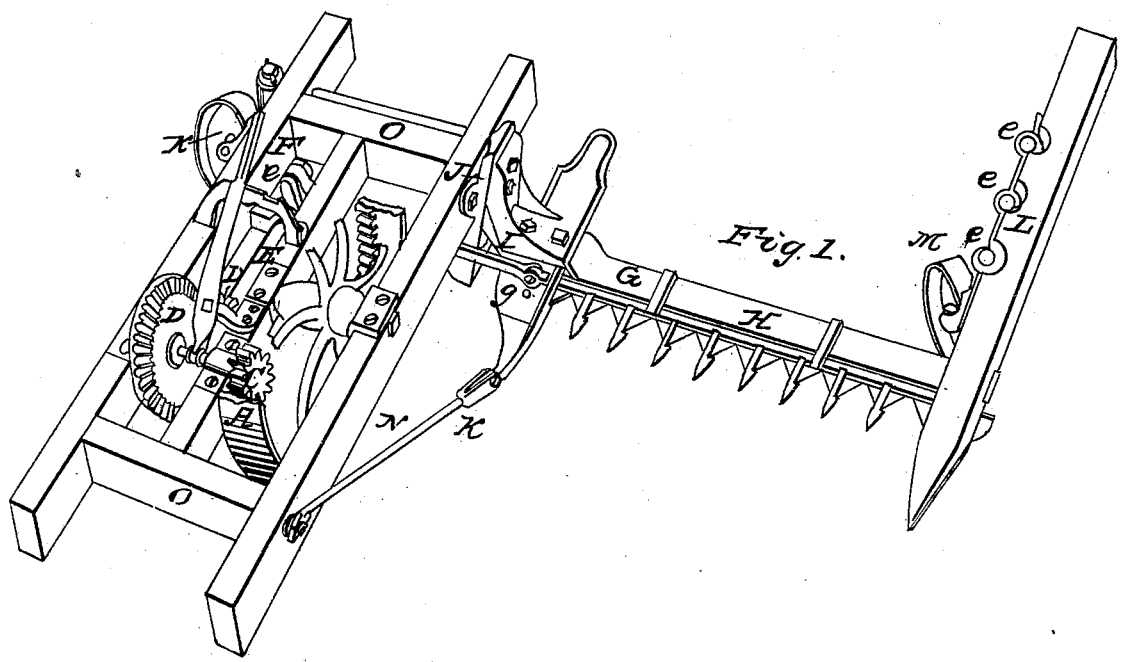
Figure 2:
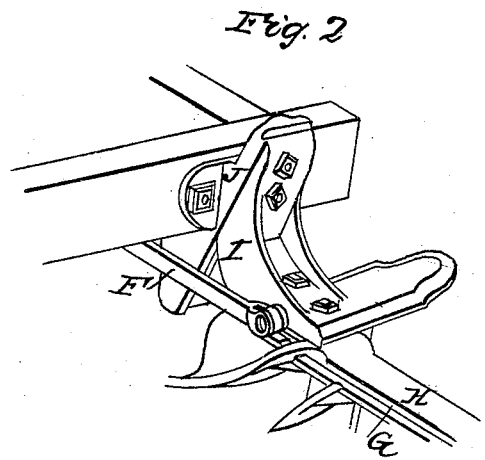

Figure 1 is a general view of a machine, showing the sickle-beam in connection. Fig. 2 is a detached view of the manner of connecting the sickle-beam to the frame.

The operation and character of my improvement is best illustrated by reference to the drawings, which show a "cog-machine," so called, the upper half of the driving-wheel being removed to show more plainly the connection of the various parts.

A is the driving-wheel, supported on the rectangular frame O O, and giving motion through the cogs B to the pinion-wheel C, and through the beveled gearing D to the crank-shaft E, which works the connecting-rod F, vibrating the sickle-bar G, which moves in the sickle-beam H.

As will be seen more clearly and distinctly from Fig. 2, the slotted frame J, in which the sliding arm I of the sickle-beam moves up and down, is attached to the frame of the machine at an angle or inclination downward and toward the crank shaft or lever E, and also at an angle or inclination forward toward the driving-wheel. The sliding arm I is also fixed to the sickle-beam upon an angle corresponding to the first or downward inclination above described as given to the frame J, so that when the sickle-beam is connected with the machine the beam and sickle will be horizontal or at right angles with the frame of the machine. The downward inclination of the frame J, or the obtuse angle made by it and the connecting-rod F, is not, however, a fixed angle, but will vary according to the length of this connection, and will differ somewhat in different cases. This inclination, however, should be such in all cases that the distance from the lever or the end e of the crank-shaft E to the end g of the sickle-bar, or, in other words, that the length of the connection-rod F, will be the same when the sickle is dropped near the ground for mowing or elevated for reaping. For convenience and economy of construction this inclination is straight, but its practical operation is the same as if it were a part or arc of a circle having a radius equal in length with the connecting-rod F, and when desired or preferred the faces of the frame J and sliding arm I may be slightly curved. The forward inclination of the frame J is such as to correspond with the angle of the crank-shaft E, so that the connecting-rod F may have the same position in respect to the crank-shaft whether the sickle is raised or dropped, and prevent any twist or binding in the joint between the rod F and sickle-bar. This inclination will not, however, be required except when "crank-machines," so called, are used. If machines which give motion to the sickle by means of a lever instead of a crank—such as Dietz and Dunham's, patented in 1855—are used, the slotted frame J will have given it only one and the downward inclination.

The brace N is for supporting and strengthening the sickle-beam, and can be adjusted to the position of the sickle-beam, as it is raised or dropped, by removing the nut *h*, taking off the brace, and giving it a few turns, as necessary, in the nut *k*, and then refastening it with *h*; or any other plan of adjustment may be used, as preferred.

The frame of the machine is supported and steadied by the caster-wheel K, which is of such a size that it will swing under the frame in turning, &c.

In order to keep the outer end of the sickle-beam at the same height with the inner end, as it is raised or lowered, and to elevate or lower such outer end by using but a single wheel, I place the beam or bar L on an incline, as shown in the drawings, and attach thereto any desired number of sockets, *l l l*, in which rests the caster-wheel M, and which can be transferred from one to the other by merely taking out the pin *m*. The beam L, being on an incline, allows the wheel M to turn under it in whichever socket it may be placed, and this wheel, being a pivot-wheel, will accommodate itself to the direction of the machine when being turned, and not draw sidewise, tearing the ground, &c., and increasing the draft.

I am aware that the use of a sliding arm or equivalent means has been employed for changing the elevation of the sickle, and therefore I do not claim generally the application of a slotted frame and sliding arm for such purpose; but

What I claim as my invention, and desire to secure by Letters Patent, is—

In combination with the rear part of the rectangular frame O, the supporting caster-wheels K M, with the inclined sliding frame and arm J and I, adjustable brace N, and inclined bar L, furnished with a series of sockets, $l\ l\ l$, the whole arranged substantially as and for the purposes set forth.

JOHN G. DUNHAM.

Witnesses:
S. D. LAW,
ALFRED MCINTIRE.